(12) United States Patent
Dhabade et al.

(10) Patent No.: US 11,549,392 B2
(45) Date of Patent: Jan. 10, 2023

(54) STRUCTURE AND METHOD TO MITIGATE ROTOR BOW IN TURBINE ENGINE

(71) Applicant: General Electric Company, Schenectady, NY (US)

(72) Inventors: Milind Chandrakant Dhabade, Bangalore (IN); Kudum Shinde, Bangalore (IN); Thomas Edward Agin, Cincinnati, OH (US); Weize Kang, Mason, OH (US); Praveen Sharma, Bangalore (IN); Shivam Mittal, Bangalore (IN)

(73) Assignee: General Electric Company, Schenectady, NY (US)

( * ) Notice: Subject to any disclaimer, the term of this patent is extended or adjusted under 35 U.S.C. 154(b) by 468 days.

(21) Appl. No.: 15/842,168

(22) Filed: Dec. 14, 2017

(65) Prior Publication Data
US 2019/0186289 A1 Jun. 20, 2019

(51) Int. Cl.
*F01D 21/12* (2006.01)
*F01D 17/10* (2006.01)
(Continued)

(52) U.S. Cl.
CPC ............... *F01D 21/12* (2013.01); *F01D 5/02* (2013.01); *F01D 17/10* (2013.01); *F01D 19/02* (2013.01); *F01D 25/36* (2013.01); *F02C 6/14* (2013.01); *F02C 7/268* (2013.01); *F02C 7/275* (2013.01); *F02C 7/32* (2013.01); *F05D 2260/404* (2013.01); *F05D 2260/406* (2013.01); *F05D 2260/4023* (2013.01); *F05D 2260/4031* (2013.01); *F05D 2260/40311* (2013.01); *F05D 2260/532* (2013.01)

(58) Field of Classification Search
CPC .......... F01D 21/12; F01D 25/34; F01D 25/36; F01D 19/00; F01D 19/02; F01D 21/00; F01D 21/06; F02C 7/32; F02C 7/268; F02C 7/275; F02C 7/277; F02C 6/14; F05D 2220/60; F05D 2260/42; F05D 2260/43; F05D 2260/406; F05D 2260/53; F05D 2260/532; F05D 2260/404; F05D 2260/4031; F05D 2260/40311; F05D 2260/4023
See application file for complete search history.

(56) References Cited

U.S. PATENT DOCUMENTS 3,094,311 A   6/1963   Goldstein
3,793,905 A   2/1974   Black et al.
(Continued)

FOREIGN PATENT DOCUMENTS

EP   2305986 A2   4/2011

*Primary Examiner* — Christopher Verdier
(74) *Attorney, Agent, or Firm* — Dority & Manning, P.A.

(57) ABSTRACT

A gas turbine engine including a first rotor assembly comprising a first drive shaft extended along a longitudinal direction; a housing coupled to the first rotor assembly to provide rotation of the first rotor assembly around an axial centerline; a first accessory assembly, wherein the first accessory assembly sends and/or extracts energy to and from the first rotor assembly; and a first clutch assembly disposed between the first rotor assembly and the first accessory assembly. The first clutch assembly engages and disengages the first rotor assembly to and from the first accessory assembly.

18 Claims, 9 Drawing Sheets

(51) Int. Cl.

| | |
|---|---|
| *F01D 5/02* | (2006.01) |
| *F01D 25/36* | (2006.01) |
| *F01D 19/02* | (2006.01) |
| *F02C 7/32* | (2006.01) |
| *F02C 7/268* | (2006.01) |
| *F02C 6/14* | (2006.01) |
| *F02C 7/275* | (2006.01) |

(56) References Cited

U.S. PATENT DOCUMENTS

| | | | |
|---|---|---|---|
| 4,733,529 A * | 3/1988 | Nelson | F01D 21/06 |
| | | | 60/39.091 |
| 4,854,120 A | 8/1989 | Nelson et al. | |
| 6,382,903 B1 | 5/2002 | Caruso et al. | |
| 7,434,406 B2 | 10/2008 | Herlihy et al. | |
| 8,419,351 B2 | 4/2013 | Richards | |
| 8,776,530 B2 | 7/2014 | Shirooni et al. | |
| 8,820,046 B2 | 9/2014 | Ross et al. | |
| 9,121,309 B2 | 9/2015 | Geiger | |
| 9,239,106 B2 | 1/2016 | Schneider et al. | |
| 9,664,070 B1 | 5/2017 | Clauson et al. | |
| 10,502,139 B2 | 12/2019 | Ross et al. | |
| 2001/0004830 A1* | 6/2001 | Wakana | F25J 1/0012 |
| | | | 60/39.182 |
| 2014/0318144 A1 | 10/2014 | Lazzeri et al. | |
| 2014/0373553 A1 | 12/2014 | Zaccaria et al. | |
| 2017/0234167 A1 | 8/2017 | Stachowiak et al. | |

\* cited by examiner

STRUCTURE AND METHOD TO MITIGATE ROTOR BOW IN TURBINE ENGINE

FIELD

The present subject matter is directed generally to structures and methods for mitigating thermal bowing in gas turbine engine rotors.

BACKGROUND

Gas turbine engines, such as those providing propulsion for aircraft, generate heat at the rotor assemblies during operation. Following shutdown of the engine, the rotor assembly is stationary (i.e., not rotating), which generally results in asymmetric heat distribution or thermal gradients circumferentially and/or axially along the rotor assembly. Such thermal gradients may generally result in thermal bowing or a bowed rotor, such as along the axial direction. A bowed rotor results in relatively large eccentricity relative to one or more casings surrounding the rotor assembly. As such, when a rotor assembly resumes operation, such eccentricity may generally cause the rotor assembly to operate with undesirable magnitudes of vibrations and non-concentricity such as to damage surrounding casings, bearing assemblies, load structures, etc. Furthermore, such operation of the engine may result in airfoil blade tips rubbing into the surrounding casing, resulting in damage to the blades, the casings, or both, and deterioration of engine performance and operability.

Known methods to mitigate bowed rotor include allowing the rotor assembly to rest until the thermal gradient has naturally decreased over time such as to remove or eliminate the bowed rotor condition. However, in various instances, an engine may need to restart sooner than free convection heat transfer may allow. Other known methods and structures include rotating the rotor assembly such as to reduce the thermal gradient across the rotor assembly. Various known examples include rotating the rotor assembly via the accessory gearbox, such as from a starter motor or generator.

However, known structures and methods for mitigating thermal bowing of the rotor assembly may require impractical amounts of energy to overcome forces and inertia from the gears, shafts, and interconnected accessory assemblies (e.g., starter/motor, generator, heat exchangers, fluid pumps, etc.) of the accessory gearbox. Thus, known structures and methods either unacceptably increase engine weight and size or require power systems (e.g., generators, batteries, energy storage devices) powerful enough to provide energy to operate from the accessory gearbox.

As such, there is a need for structures and methods for mitigating rotor bow in gas turbine engines that may overcome limitations and challenges derived from the accessory gearbox of the gas turbine engine.

BRIEF DESCRIPTION

Aspects and advantages of the invention will be set forth in part in the following description, or may be obvious from the description, or may be learned through practice of the invention.

The present disclosure is directed to a gas turbine engine including a first rotor assembly comprising a first drive shaft extended along a longitudinal direction; a housing coupled to the first rotor assembly to provide rotation of the first rotor assembly around an axial centerline; a first accessory assembly, wherein the first accessory assembly sends and/or extracts energy to and from the first rotor assembly; and a first clutch assembly disposed between the first rotor assembly and the first accessory assembly. The first clutch assembly engages and disengages the first rotor assembly to and from the first accessory assembly.

In one embodiment, the first clutch assembly is disposed at a shaft coupled to the first rotor assembly and the first accessory assembly. The first clutch assembly engages and disengages at least a portion of the shaft from the first rotor assembly and the first accessory assembly.

In another embodiment, the first clutch assembly includes a first clutch mechanism to engage and disengage the first rotor assembly to and from the first accessory assembly. The first clutch mechanism is disposed at a shaft coupled to the first rotor assembly and the first accessory assembly.

In yet another embodiment, the first clutch assembly defines one or more of a manual, hydraulic, pneumatic, solenoid controlled clutch, a mechanical, electrical electromagnetic, or electro-mechanical transmission system, or a centrifugal clutch.

In still yet another embodiment, the first clutch assembly is disposed at least partially within the housing.

In one embodiment, the first clutch assembly disengages the first accessory assembly at or below a first speed threshold.

In another embodiment, the gas turbine engine further includes a mechanical switch coupled to the first clutch assembly. Switching of the mechanical switch engages and disengages the first clutch assembly to and from the first rotor assembly.

In various embodiments, the gas turbine engine further includes a second rotor assembly including a second drive shaft extended along the longitudinal direction, wherein the first clutch assembly is further disposed between the first accessory assembly, the first rotor assembly, and the second rotor assembly. In one embodiment, the gas turbine engine further includes a second clutch assembly coupled to the first clutch assembly and the second rotor assembly. The second clutch assembly is disposed at least partially within the housing. In another embodiment, the gas turbine engine further includes a mechanical switch coupled to the first clutch assembly. Switching of the mechanical switch engages and disengages the first clutch assembly to and from the first rotor assembly. Switching of the mechanical switch further engages the second clutch assembly to the second rotor assembly when the first clutch assembly is disengaged from the first accessory assembly. Switching of the mechanical switch disengages the second clutch assembly from the second rotor assembly when the first clutch assembly is engaged to the first accessory assembly.

In another embodiment, the gas turbine engine further includes an energy source device disposed within the housing. The energy source device is configured to provide energy to rotate one or more of the first rotor assembly or a second rotor assembly.

Another aspect of the present disclosure is directed to a method of mitigating thermal bowing in a gas turbine engine. The method includes decoupling a first accessory assembly from a first rotor assembly via a first clutch assembly disposed between the first accessory assembly and the first rotor assembly; and flowing a fluid through the gas turbine engine to induce rotation of the first rotor assembly decoupled from the first accessory assembly.

In one embodiment of the method, decoupling the first accessory assembly and the first rotor assembly occurs at or below a first speed threshold.

In another embodiment, the method further includes coupling the first rotor assembly to a second rotor assembly via a second clutch assembly.

In still another embodiment, the method further includes rotating the second rotor assembly and the first rotor assembly via the flow of fluid through the gas turbine engine.

In still yet another embodiment, the first clutch assembly decouples the first accessory assembly from the first rotor assembly between the first accessory assembly and the first rotor assembly.

Still another aspect of the present disclosure is directed to a method of rotating a first rotor assembly to mitigate thermal bowing in a gas turbine engine. The method includes decoupling a first accessory assembly from a first rotor assembly via a first clutch assembly disposed between the first accessory assembly and the first rotor assembly; and rotating the first rotor assembly via an energy source providing energy to the first clutch assembly and the first rotor assembly.

In one embodiment, the energy source provides intermittent bursts or continuous flows of energy to intermittently or continuously rotate one or more of the first rotor assembly or a second rotor assembly.

In another embodiment, the first clutch assembly decouples the first accessory assembly from the first rotor assembly between the first accessory assembly and the first rotor assembly.

In yet another embodiment, the method further includes coupling the first rotor assembly to a second rotor assembly via a second clutch assembly; and rotating the second rotor assembly and the first rotor assembly via the energy from the energy source.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of structures and methods for mitigating rotor bow in gas turbine engines that may overcome limitations and challenges derived from a first accessory assembly are generally provided. The structures and methods generally shown and described herein enable rotation of a high pressure (HP) spool of a gas turbine engine following shutdown such as to reduce a thermal gradient circumferentially and/or axially across the HP spool, thereby mitigating thermal bowing of the HP spool. The structures and methods generally provided herein reduce or eliminate inertial forces from the first accessory assembly (e.g., accessory gearbox) such as to enable the HP spool to rotate via a flow of air, such as natural wind or an external fan assembly. The structures and methods generally provided herein further enable a low pressure (LP) or intermediate pressure (IP) spool to engage the HP spool and enable rotation of the HP spool via the LP or IP spool, such as the fan assembly. In combination with reducing or eliminating inertial forces from the first accessory assembly, the structures and methods generally provided herein enable windmilling or manual turning of a fan assembly, or generally the LP or IP spool, to further enable rotation of the HP spool to reduce or eliminate a thermal gradient that may cause thermal bowing.

Figure 1:
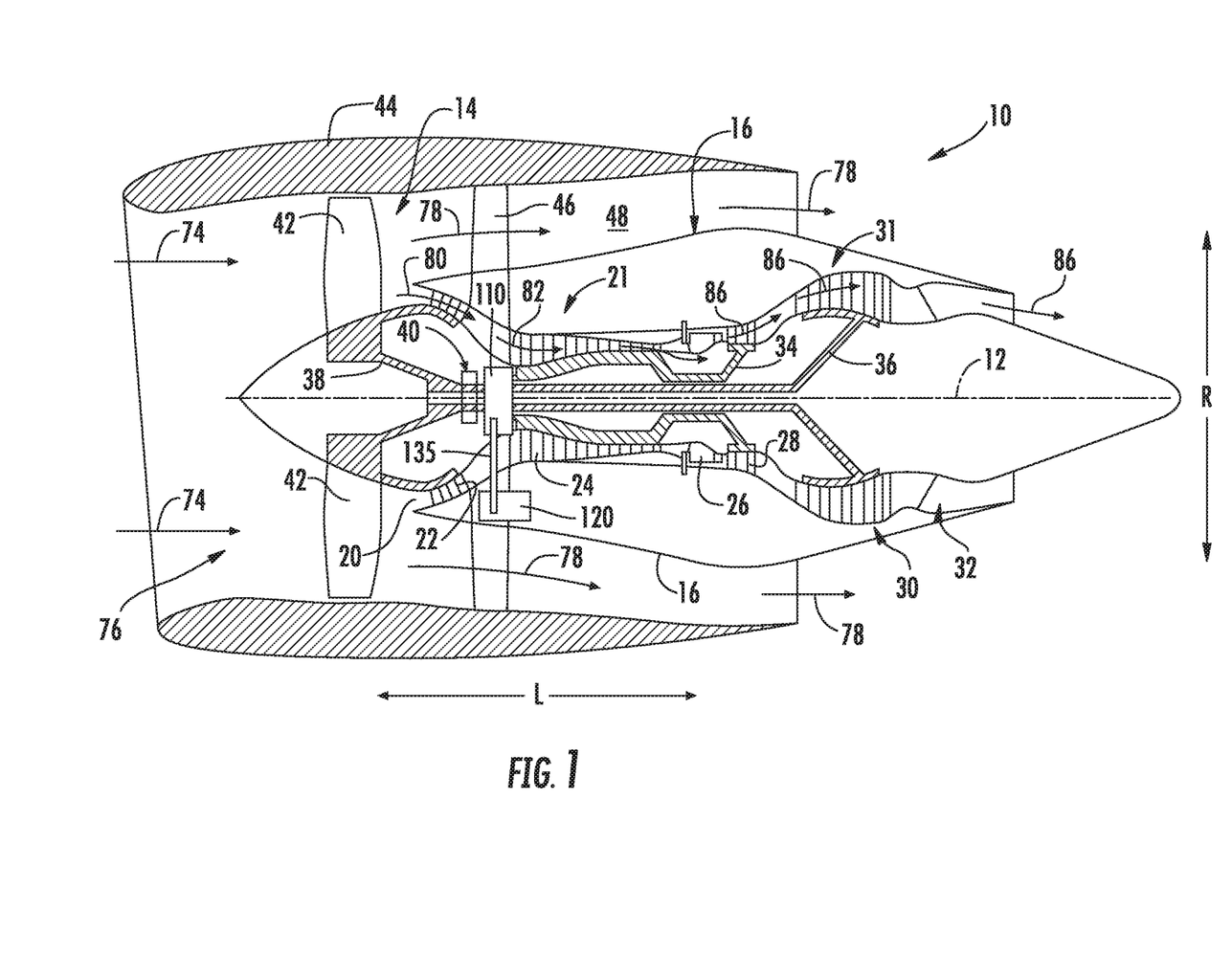
FIGS. 1-3 are exemplary embodiments of a gas turbine engine according to an aspect of the present disclosure.
Figure 2:
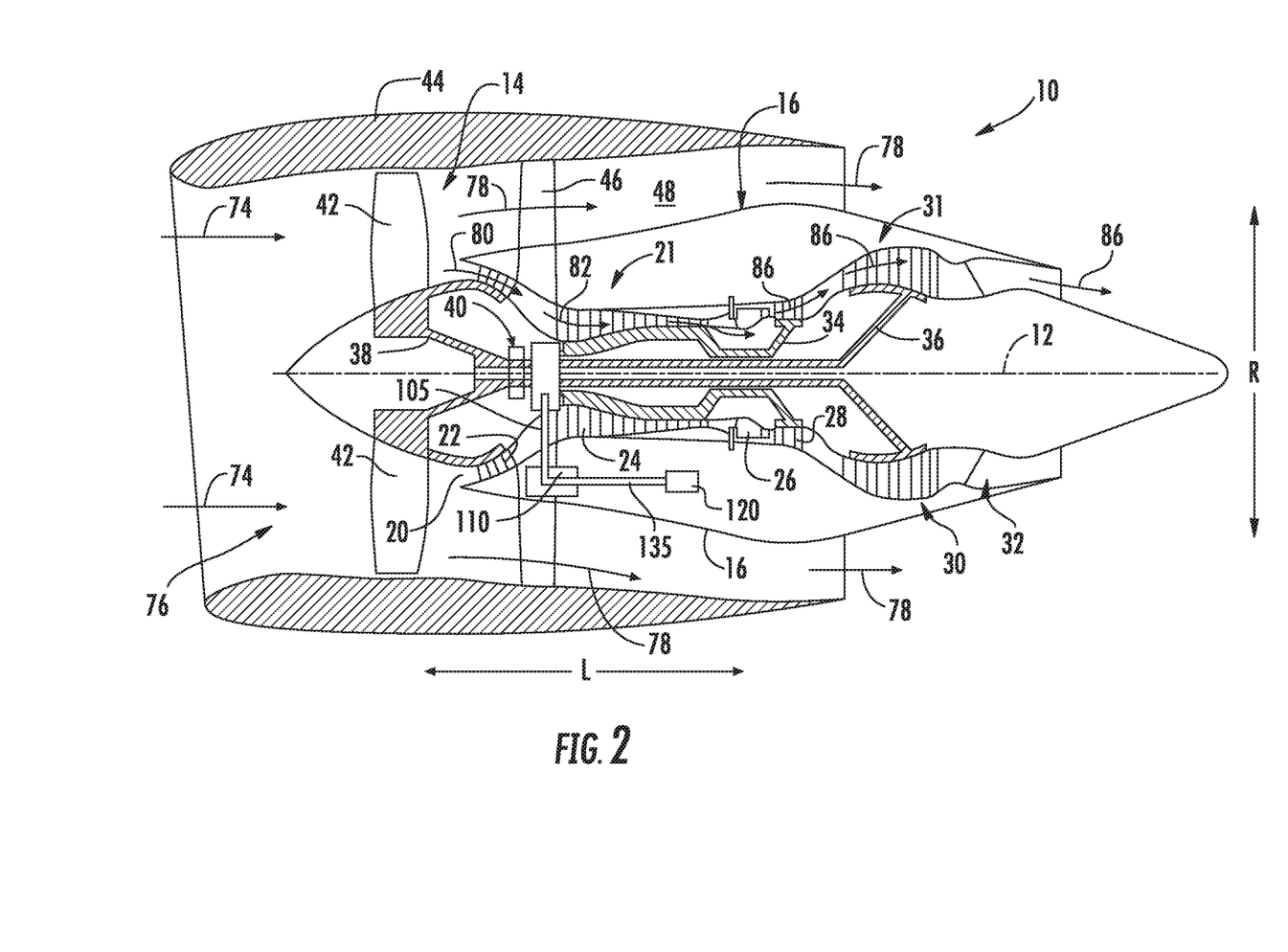

Referring now to the drawings, FIGS. 1-2 are schematic cross sectional views of an exemplary gas turbine engine 10 (herein referred to as "engine 10"), shown as a high bypass turbofan engine incorporating structures and methods of mitigating thermal bowing of a rotor assembly according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIGS. 1-2, the engine 10 has a longitudinal or axial centerline axis 12 that extends there through for reference purposes generally along a longitudinal direction L. The engine 10 further defines a radial direction R extended from the axial centerline axis 12.

In general, the engine 10 may include a substantially tubular outer casing 16 that defines an annular inlet 20. The outer casing 16 encases or at least partially flows, in serial flow arrangement, a compressor section 21, a combustion section 26, and a turbine section 31. In the embodiment shown in FIGS. 1-2, the compressor section 21 defines a high pressure (HP) compressor 24 coupled to a HP shaft 34, and a low or intermediate pressure compressor 22 in serial arrangement with the HP compressor 24. The turbine section 31 defines a HP turbine 28 coupled to the HP shaft 34 to extract energy from combustion gases 86 to drive the HP shaft 34 and HP compressor 24.

A fan assembly 14 is disposed forward or upstream of the compressor section 21. The fan assembly 14 includes a fan rotor 38. The fan rotor 38 includes one or more fan stages, in which each fan stage defines a plurality of propeller or fan blades 42 that are coupled to and extend outwardly from the fan rotor 38 in the radial direction R. In one embodiment as shown in FIG. 1, the fan rotor 38 defines a single fan stage or single circumferentially adjacent arrangement of the plurality of blades 42. In various other embodiments, the fan assembly 14 may further define a plurality of the stages. The fan rotor 38 is together rotatable about the axial centerline 12. An annular fan casing or nacelle 44 circumferentially surrounds at least a portion of the fan assembly 14 and/or at least a portion of the outer casing 16. In one embodiment, the nacelle 44 may be supported relative to the outer casing 16 by a plurality of circumferentially-spaced outlet guide vanes or struts 46. At least a portion of the nacelle 44 may extend over an outer portion (in radial direction R) of the outer casing 16 so as to define a bypass airflow passage 48 therebetween.

The turbine section 31 further defines a low pressure (LP) turbine 30 generally downstream of the HP turbine 28. In the embodiment generally provided in FIG. 1, the LP turbine 30 is coupled to a LP shaft 36 to which the LP compressor 22 is coupled. The LP turbine 30 extracts energy from combustion gases 86 to drive the LP compressor 22. In various embodiments, the fan rotor 38 and fan blades 42 are coupled to the LP shaft 36 such as to define a direct drive configuration such that the LP turbine 30 rotates at a generally similar rotational speed as the LP compressor 22 and fan rotor 38. In other embodiments, such as generally provided in FIG. 1, a speed reduction device 40 is coupled to the LP shaft 36 and the fan rotor 38 to define an indirect drive configuration. The indirect drive configuration generally enables a different rotational speed of the fan rotor 38 relative to the LP shaft 36 and LP turbine 30 from which energy is provided. For example, the speed reduction device 40 may define a reduction or power gear assembly, such as, but not limited to, a planetary gear assembly.

Figure 3:
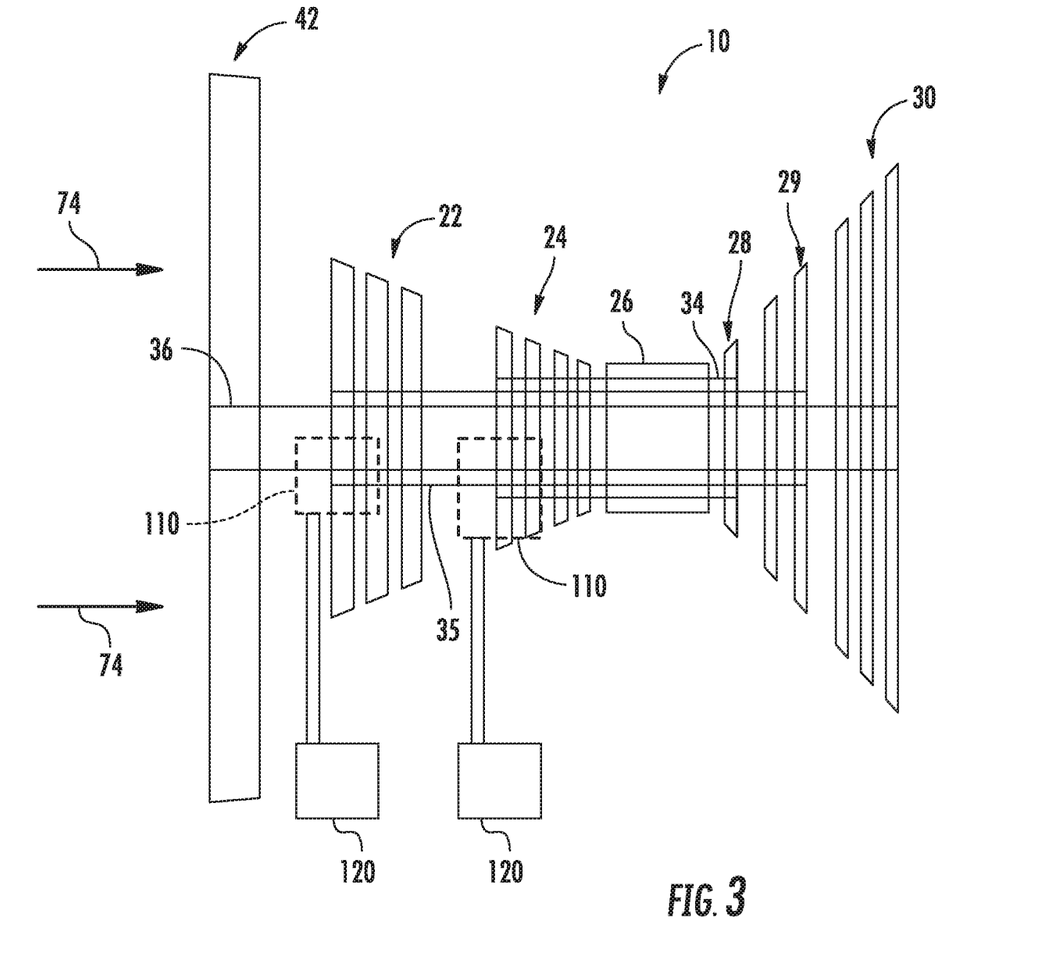

Referring now to FIG. 3, an exemplary embodiment of the engine 10 shown in FIGS. 1-2 is generally provided further defining a three spool gas turbine engine. As such, the engine 10 defines the fan assembly 14 coupled to the LP turbine 30 via the LP shaft 36, together defining an LP spool. An intermediate pressure (IP) turbine 29 is coupled to the LP or IP compressor 22 via an IP shaft 35, together defining an IP spool. The HP turbine 28 is coupled to the HP compressor 24 via the HP shaft 34, together defining an HP spool. Each combination of shaft 34, 35, 36, turbine 28, 29, 30, and compressor/fan 14, 22, 24 are generally mechanically independent such as to enable rotation of one shaft without necessarily driving rotation of another shaft, except as further discussed herein. Various embodiments of a first rotor assembly 100 and a second rotor assembly 200 described herein may define one or more combinations of the HP spool, the IP spool, and the LP spool. For example, the first rotor assembly 100 may define the HP spool, the LP spool, or the IP spool and the second rotor assembly 200 may define one or more of the spools different from the first rotor assembly 100.

Referring back to FIGS. 1-2, the engine 10 may generally include an exhaust nozzle 32 coupled downstream to the turbine section 31 to direct the flow of combustion gases 86 from the engine 10.

During operation of the engine 10, as shown in FIGS. 1-2, a volume of air as indicated schematically by arrows 74 enters the engine 10 through an associated inlet 76 of the nacelle and/or fan assembly 14. As the air 74 passes across the blades 42 of the fan assembly 14, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 31, causing rotary members of the turbine section 31 to rotate and support operation of respectively coupled rotary members in the compressor section 21 and/or fan assembly 14.

Figure 4:
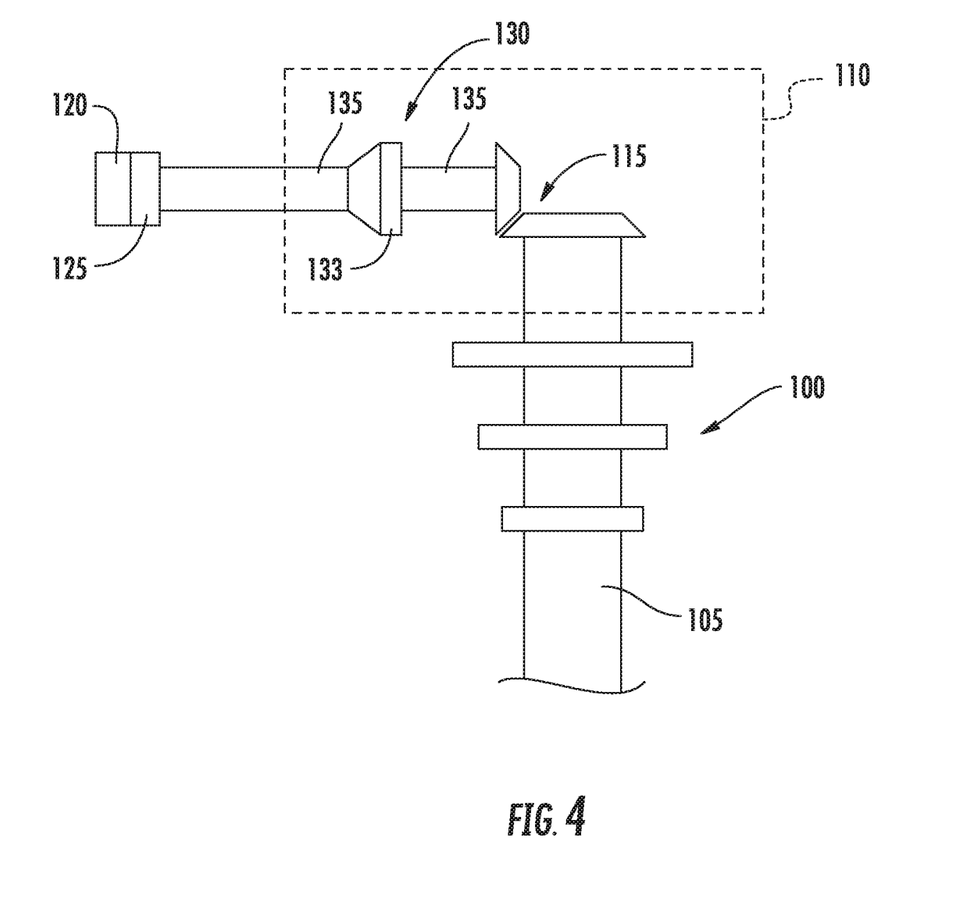
FIG. 4 is a schematic embodiment of a portion of the gas turbine engine of FIGS. 1-3 further depicting embodiments of a clutch assembly of the present disclosure.

Referring now to FIG. 4, an exemplary schematic embodiment of the engine 10 is generally provided. The engine 10 includes a first rotor assembly 100 including a first drive shaft 105 extended along the longitudinal direction L. In various embodiments, the first drive shaft 105 is the HP shaft 34 such as depicted in FIG. 1. Furthermore, in various embodiments, the first rotor assembly 100 includes the HP shaft 34, the HP compressor 24, and the HP turbine 28, together generally defining the HP spool of the engine 10. In other embodiments, the first rotor assembly 100 may include the IP spool or the LP spool.

In various embodiments, a housing 110 is coupled to the first rotor assembly 100 to provide rotation of the first rotor assembly 100 around the axial centerline 12. For example, the housing 110 may be generally disposed within a frame of the engine 10 such as to enable rotation of the first rotor assembly 100 relative to the static frame. In various embodiments, such as wherein the first rotor assembly 100 defines an HP spool of the engine 10, the housing 110 may define at least a forward HP spool bearing compartment (e.g., #3 bearing assembly) of the engine 10. The bearing compartment may generally include one or more bearings, such as a rolling element bearing, a fluid film bearing, an air bearing, etc. The rolling element bearing may include a roller bearing, a tapered roller bearing, a spherical or ball bearing, etc. In other embodiments, such as further described herein, the housing 110 may further define a LP or IP spool bearing, such as a #2 bearing assembly for the LP or IP spool.

The engine 10 further includes a first accessory assembly 120 including one or more accessories 125 configured to send and extract energy to and from the first rotor assembly 100 via the housing 110. More specifically, the first accessory assembly 120 may be configured to send and extract energy via one or more gears of a first gear assembly 115 (e.g., bevel gears) disposed within the housing 110. The accessories 125 of the first accessory assembly 120 may generally include, but are not limited to, a starter motor or air turbine starter providing energy to rotate the first rotor assembly 100, such as during startup and/or ignition. The first accessory assembly 120 may further include, at least in part, one or more gearboxes, gear assemblies, fluid systems, pumps, scavenges, heat exchangers, electric machines, generators, starter motors, etc. For example, the first accessory assembly 120 may include a starter motor, air turbine starter, or generator providing energy to rotate the first rotor assembly 100 from rest or approximately zero rotation via a shaft 135 coupled to the first accessory assembly 120 and the housing 110. More specifically, the first accessory assembly 120 may provide energy to rotate the shaft 135 coupled to the first gear assembly 115 disposed within the housing 110. Rotation of the shaft 135 rotates the first gear assembly 115 and the first rotor assembly 100. Rotation of the first rotor assembly 100 enables initial operation of the engine 10, such as startup and ignition, by providing the initial volume of air 74 as described in regard to FIG. 1.

Referring still to FIG. 4, the engine 10 further includes a first clutch assembly 130 including the shaft 135 coupled to the first rotor assembly 100 and the first accessory assembly 120. A first clutch mechanism 133 is disposed at the shaft 135. In various embodiments, such as generally provided in FIG. 4, the first clutch mechanism 133 is defined within the housing 110. Generally, the first clutch mechanism 133 is defined outside of the first accessory assembly 120, such as between the first accessory assembly 120 and the first rotor assembly 100. As such, the first clutch mechanism 133 engages and disengages at least a portion of the shaft 135 from the first rotor assembly 100 and the first accessory assembly 120. More specifically, in one embodiment, the first clutch mechanism 133 is disposed at the shaft 135 between the first rotor assembly 100 and the first accessory assembly 120. As such, when the first clutch mechanism 133 disengages the first rotor assembly 100 from the first accessory assembly 120, a flow of air, such as flow of fluid 74, (e.g., due to windmilling) may rotate the first rotor assembly 100 due to reducing or eliminating forces (e.g., inertial forces) from the accessories, gears, shafts, etc. of the first accessory assembly 120 that would otherwise be too large to enable a flow of air (e.g., flow of fluid 74) to rotate the first rotor assembly 100.

Referring back to the engine 10 generally provided in FIG. 2, the housing 110, at least partially into which the first clutch assembly 130 is disposed, may further be disposed between the first accessory assembly 120 and the first drive shaft 105. In the embodiment generally provided in FIG. 2, the first drive shaft 105 may define a radially extended shaft (e.g., radial shaft or towershaft) extended from the housing 110 to one or more of the LP spool or HP spool (such as described in regard to FIGS. 1-2) or the IP spool (such as described in regard to FIG. 3). In one embodiment, the housing 110 may define a transfer gearbox assembly disposed between the first accessory assembly (e.g., defining an accessory gearbox assembly) and one or more of the LP spool, the IP spool, or the HP spool. As such, the first clutch assembly 130 may engage and disengage the LP spool, the IP spool, or the HP spool to and from the first accessory assembly 120 to decrease inertial forces that may inhibit rotation of one or more of the spools via the flow of fluid 74, manual tool or hand driven operation, or a source of energy such as an energy storage device (e.g., energy source device 140 shown and described in regard to FIGS. 7-8).

Figure 5:
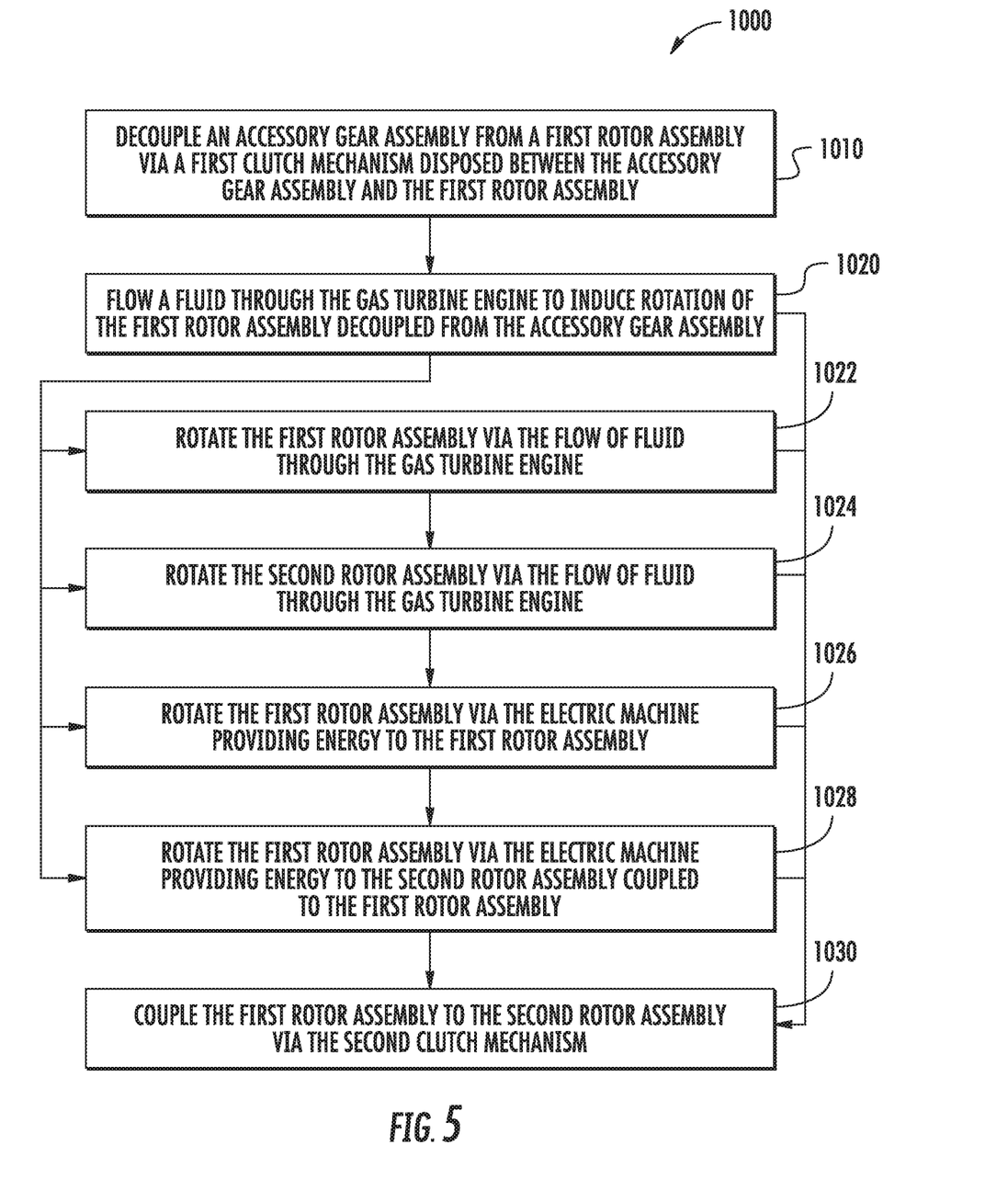
FIG. 5 is a flowchart outlining exemplary steps of a method of mitigating thermal bowing of a rotor assembly of a gas turbine engine.

Referring now to FIG. 5, a flowchart outlining exemplary steps of a method for operating a gas turbine engine (hereinafter, "method 1000"). In various embodiments, the method 1000 may be implemented and executed to mitigate thermal bowing in a gas turbine engine (e.g., engine 10). The method 1000 may further be implemented and executed to rotate a rotor assembly to mitigate thermal bowing of the rotor assembly of a gas turbine engine. The method 1000 may generally be utilized to reduce inertial forces acting upon the first rotor assembly such as to aid or further enable rotation of the first rotor assembly via a reduced force, such as, but not limited to, wind or manual turning (e.g., by hand or tool).

The method 1000 may be implemented and executed in the engine 10 including embodiments of the first clutch assembly 130 such as described in FIGS. 1-4 and further in regard to FIGS. 6-9. It should be appreciated that the method 1000 outlined and described herein may be re-ordered or re-sequenced, and steps may be added, removed, or re-arranged, without removing from the scope of the present disclosure. Furthermore, although the method 1000 may be described and illustrated in regard to FIGS. 1-4, it should be appreciated that the method 1000 may further apply to embodiments of a gas turbine engine beyond those of which are shown and described in regard to FIGS. 1-4 and FIGS. 6-9.

The method 1000 includes at 1010 decoupling a first accessory assembly from a first rotor assembly via a first clutch mechanism disposed between the first accessory assembly and the first rotor assembly; and at 1020 flowing a fluid through the gas turbine engine to induce rotation of the first rotor assembly decoupled from the first accessory assembly. As described in regard to FIGS. 1-3, decoupling the first accessory assembly 120 from the first rotor assembly 100 is more specifically between the first accessory assembly 120 and the first rotor assembly 100, such as to reduce or eliminate forces (e.g., inertial forces) due to the first accessory assembly 120 that may otherwise disable rotating the first rotor assembly 100 based on the flow of fluid through the engine 10, such as outlined at step 1020. In one embodiment, the first clutch mechanism decouples the first accessory assembly from the first rotor assembly within a housing coupled to the first rotor assembly. In another embodiment, the first clutch mechanism decouples the first accessory assembly from the first rotor assembly at a shaft extended between the first rotor assembly and the first accessory assembly. In various embodiments, the shaft (e.g., shaft 135) may define a radial shaft or towershaft coupled to and extended between the first accessory assembly 120 and the housing 110.

Flowing the fluid (e.g., air 74, air 80 in FIGS. 1-2) through the gas turbine engine may include a flow of air such as wind (i.e., windmilling). In other embodiments, such as generally depicted in FIG. 4, the flow of fluid 74 may include air generated and provided through the engine 10 directing a flow of air into the engine 10, such as a flow of air via an external fan providing air to the engine 10. As such, decoupling the first accessory assembly 120 from the first rotor assembly 100 and providing the flow of fluid 74 may enable and induce rotation of the first rotor assembly 100.

As thermal bowing of a rotor assembly is due at least in part to thermal gradients due to asymmetric circumferential and/or axial heat distribution across the rotor disks, hubs, drums, or shafts, rotation of the first rotor assembly 100 enables relatively warmer portions of the first rotor assembly 100 to be disposed to relatively cooler circumferential portions of the engine 10, and relatively cooler portions of the first rotor assembly 100 to be disposed to relatively warmer circumferential portions of the engine 10, thereby aiding heat transfer and reducing a difference in temperature between the warmer and cooler portions of the first rotor assembly 100. Additionally, the flow of fluid 74 may provide cooling to the first rotor assembly 100.

Referring now to FIGS. 1-6, in one embodiment, the first clutch mechanism 133 may be operable via a manual, hydraulic, pneumatic, or solenoid control. In one non-limiting example, such as further illustrated in FIG. 7, the first clutch assembly 130 may include a mechanical switch 137 coupled thereto. The mechanical switch 137 may define a manual clutch or manual control such as may include a lever operable by a person. The mechanical switch 137 may extend through the housing 110 to external of the engine 10.

In another non-limiting example, the first clutch mechanism 133 may define an automatic clutch, such as a mechanical, electrical, electromagnetic, or electro-mechanical transmission system that engages or disengages the first clutch assembly 130 to and from the first rotor assembly 100, a second rotor assembly 200, or both. In yet another non-limiting example, the first clutch mechanism 133 of the first clutch assembly 130 defines a centrifugal clutch configured to disengage or decouple the first accessory assembly 120 at or below a first speed threshold.

In various embodiments, the aforementioned examples or embodiments of the first clutch assembly 100 and first clutch mechanism 133 may engage or disengage at or below a first speed threshold such as described in regard to step 1010. For example, the engine 10 may begin operation from rest or approximately no rotation of the first rotor assembly 100. An accessory 125 of the first accessory assembly 120, such as a starter motor or generator, provides an input energy or motive force to rotate the shaft 135 of the first clutch assembly 130 disengaged from the first gear assembly 115 within the housing 110, thereby disengaged from the rotor assembly 100. When the shaft 135 rotates at or above a first speed threshold, the first clutch mechanism 133 engages the first gear assembly 115 such as to enable power transfer from the first accessory assembly 120 to the first rotor assembly 100, thereby rotating the first rotor assembly 100. As previously described, the flow of air 80 is pulled into the engine 10 and compressed into the compressed air 82. When the first rotor assembly 100 reaches at least a certain speed (and, as such, the compressed air 82 is of a certain pressure), a liquid or gaseous fuel is introduced to the combustion section 26 and mixed and ignited with the compressed air 82 to yield combustion gases 86. Further increases and decreases in speed, pressure, etc. of the first rotor assembly 100 are then generally controlled via changes in fuel-air mixture, such as via changes in fuel flow to the combustion section 26, bleed valves at the compressor section 21, variable stator vanes, or combinations thereof.

During shutdown, the flow of fuel to the combustion section 26 is stopped such that rotation of the first rotor assembly 100 will eventually reduce to approximately zero as no additional energy is provided to induce rotation of the first rotor assembly 100. As the rotational speed of the first rotor assembly 100 reduces approximately to or below the first speed threshold, the first clutch mechanism 133 disengages from the first accessory assembly 120, such as previously described.

It should be appreciated that in one embodiment the first speed threshold may be defined relative to the shaft 135, which may be different from a rotational speed of the rotor assembly 100 when coupled due to the first gear assembly 115 within the housing 110 coupling the shaft 135 to the rotor assembly 100. As such, the shaft 135 may generally define a fixed or proportional relationship such that a first speed of the shaft 135 is generally equal to or proportional to a second speed of the rotor assembly 100. Furthermore, it should be appreciated that the shaft 135 and the first rotor assembly 100 may be at least instantaneously or temporarily disproportional upon and immediately following engagement of the first clutch mechanism 133 engaging the first accessory assembly 120 to the first rotor assembly 100.

It should further be appreciated that in various embodiments the first speed threshold may be determined relative to a rotational speed of the first rotor assembly 100. For example, the first speed threshold may generally define a speed approximately at which the fuel is provided to the combustion section 26 to mix with the compressed air 82 and ignited to produce combustion gases 86 to sustain rotation of the first rotor assembly 100 without input energy from the first accessory assembly 120.

Figure 6:
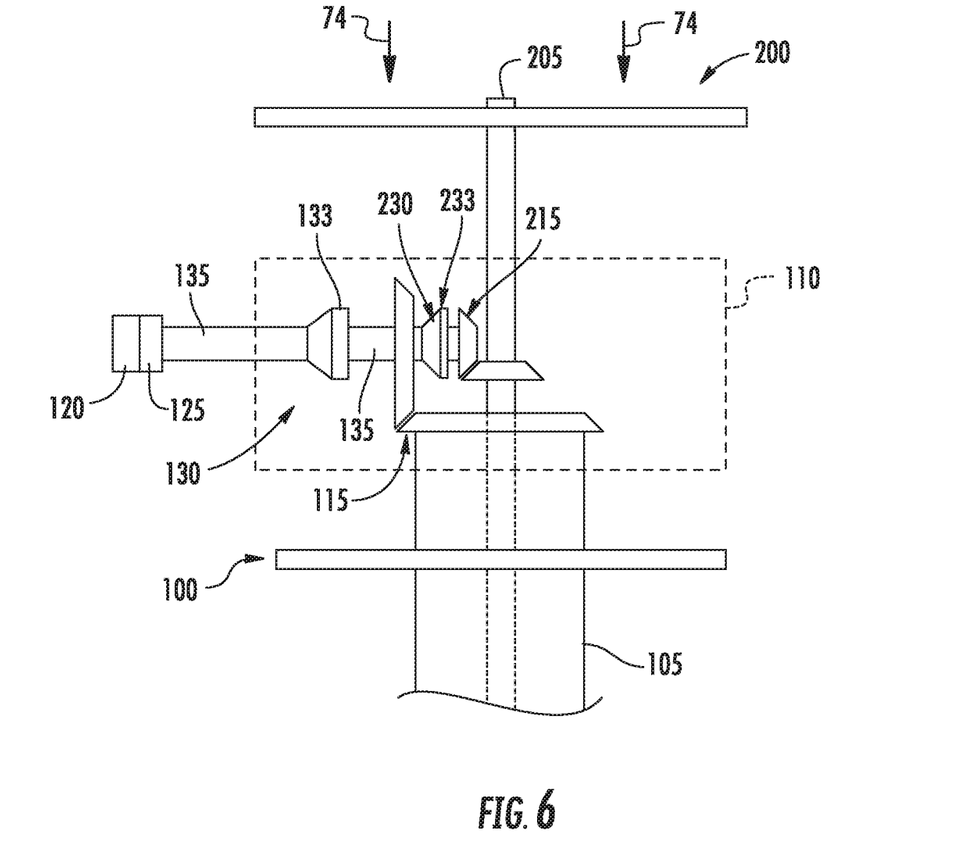
FIGS. 6-9 are yet other schematic embodiments of a portion of the gas turbine engine of FIGS. 1-3 further depicting embodiments of a clutch assembly according to an aspect of the present disclosure.

Referring now to FIG. 6 another exemplary embodiment of the engine 10 is generally provided. The engine 10 may be substantially configured and operated as shown and described in regard to FIGS. 1-5. However, in FIG. 6, the engine 10 further includes a second rotor assembly 200 including a second drive shaft 205 extended along the longitudinal direction L. The second drive shaft 205 is generally concentric to the first drive shaft 105 of the first rotor assembly 100. In various embodiments, the second drive shaft 205 is the LP shaft 36 such as depicted in FIG. 1. In other embodiments, the second drive shaft 205 is the IP shaft 35 such as depicted in FIG. 3. The LP shaft 36 (and the IP shaft 35 in FIG. 3) is generally extended concentric to the HP shaft 34 and radially within and through the HP shaft 34.

The engine 10 may further include a second clutch assembly 230 defining a second clutch mechanism 233 coupled to the first rotor assembly 100 and the second rotor assembly 200. The second clutch assembly 230 is disposed at least partially within the housing 110.

The second clutch assembly 230 may generally be coupled to the shaft 135 of the first clutch assembly 130. A second gear assembly 215 is disposed at the shaft 135 and the second drive shaft 205. As such, the first gear assembly 115 coupled to the shaft 135 and the first rotor assembly 100 and the second gear assembly 215 coupled to the shaft 135 and the second rotor assembly 200 may enable mechanically dependent rotation of the first rotor assembly 100 and the second rotor assembly 200 when the second clutch assembly 230 is engaged (i.e., the second clutch mechanism 233 is coupled to the shaft 135). The mechanically dependent rotation of the first rotor assembly 100 and the second rotor assembly 200 may define a fixed or proportional relationship in rotational speed between the first rotor assembly 100 and the second rotor assembly 200. As such, the first rotor assembly 100 and the second rotor assembly 200 may each define a first rotational speed approximately equal to one another. In other embodiments, the second gear assembly 215 may provide a speed change such that the first rotor assembly 100 rotates at a first speed and the second rotor assembly 200 rotates at another speed different from the first speed. In still various embodiments, such as previously described, the shaft 135 may rotate at a speed different from the first rotor assembly 100, the second rotor assembly 200, or both.

Referring back to FIG. 5, in addition to FIG. 6, the method 1000 may further include at 1030 coupling the first rotor assembly to the second rotor assembly via the second clutch mechanism. In various embodiments, coupling the first and second rotor assemblies occurs at or below a second speed threshold different from the first speed threshold. In one embodiment, the second speed threshold is a lower rotational speed than the first speed threshold. More specifically, the second speed threshold relative to the second rotor assembly 200 is lower than the first speed threshold relative to the first rotor assembly 100. For example, as rotation of the engine 10 decreases following stoppage of fuel flow, the first clutch assembly 130 disengages from the first accessory assembly 120 approximately at or below the first speed threshold as the first rotor assembly 100 slows and reduces in rotational speed toward zero. The second clutch assembly 230 engages the shaft 135, such that the first rotor assembly 100 and the second rotor assembly 200 are in mechanical rotational dependency, approximately at or below the second speed threshold lower than the first speed threshold.

In one embodiment, in which the first clutch assembly 130 may define a first clutch mechanism in which engagement and disengagement to one or more of the first rotor assembly 100 or the second rotor assembly 200 is dependent on a speed or acceleration of the first rotor assembly 100 or the second rotor assembly 200.

It should be appreciated that the speed or acceleration at which engagement or disengagement of the first clutch mechanism may define one or more different speeds or accelerations based on a fan assembly diameter and inertial forces from the fan assembly 14. For example, the speed threshold may be based at least in part on the energy output from the accessory 125 providing energy to the shaft 135 to rotate the first rotor assembly 100. In another embodiment, the speed threshold may be based at least in part on the energy output from the accessory 125 providing energy to the shaft 135 to rotate the second rotor assembly 200 mechanically coupled to the first rotor assembly 100 from approximately zero RPM to the speed threshold.

Referring now to FIGS. 1-6, the method 1000 may further include at 1022 rotating the first rotor assembly via the flow of fluid (e.g., flow of fluid 74) through the gas turbine engine, such as previously described herein. The method 1000 may further include at 1024 rotating the second rotor assembly via the flow of fluid through the gas turbine engine generally provided at 1020. Similarly as described in regard to the first rotor assembly 100, rotating the second rotor assembly 200 may mitigate thermal bowing of the second rotor assembly 200 by reducing the thermal gradient across the second rotor assembly 200. Furthermore, coupling the second rotor assembly 200 and the first rotor assembly 100, such as generally described in regard to FIG. 6 and step 1030 of the method 1000, enables rotation of the first rotor assembly 100 via the second rotor assembly 200. More specifically, the method 1000 at 1030, and the second clutch assembly 230 such as shown and described in regard to FIG. 6, enable rotation of the first rotor assembly 100 via the fan blades 42 or fan rotor 38 of the LP spool or the IP spool (e.g., the second rotor assembly 200) such as to reduce or eliminate the thermal gradient that may cause thermal bowing. As such, enabling rotation of the first rotor assembly 100 via the fan assembly 14 or the IP spool enables a flow of air 74 across the fan blades 42 to mechanically induce rotation of the first rotor assembly 100 in contrast to generally solely rotating the first rotor assembly 100 via aerodynamic forces upon the first rotor assembly 100 (i.e., the force of the flow of fluid 74 upon the fan blades 42 transfers energy to rotate the first rotor assembly 100).

Additionally, providing mechanical dependency of the first rotor assembly 100 to the second rotor assembly 200 enables windmilling (i.e., the flow of air across the airfoils to induce rotation) of the first rotor assembly 100 via the second rotor assembly 200 via the flow of fluid 74. Furthermore, enabling rotation of the first rotor assembly 100 via the fan assembly 14 enables a person to manually rotate the second rotor assembly 200 (e.g., the fan rotor 38 or the fan blades 42) to rotate the first rotor assembly 100, such as via pushing on or rotating the fan blades 42 by hand.

Figure 7:
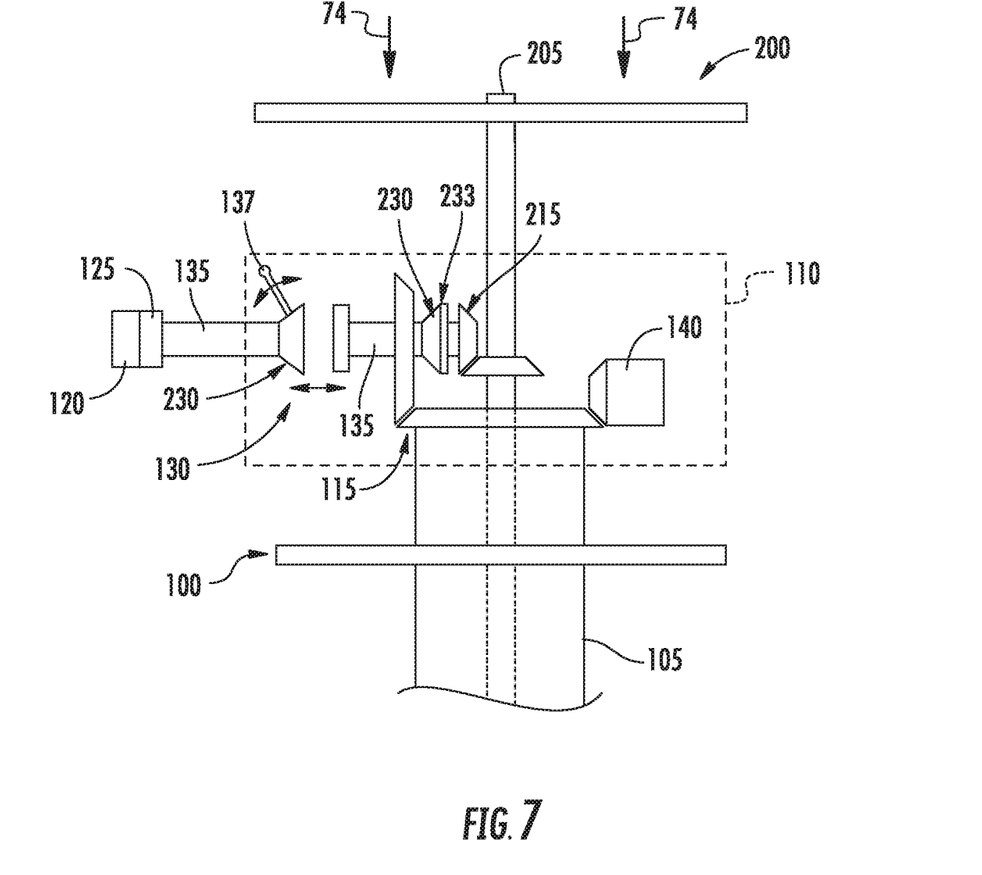
Figure 8:
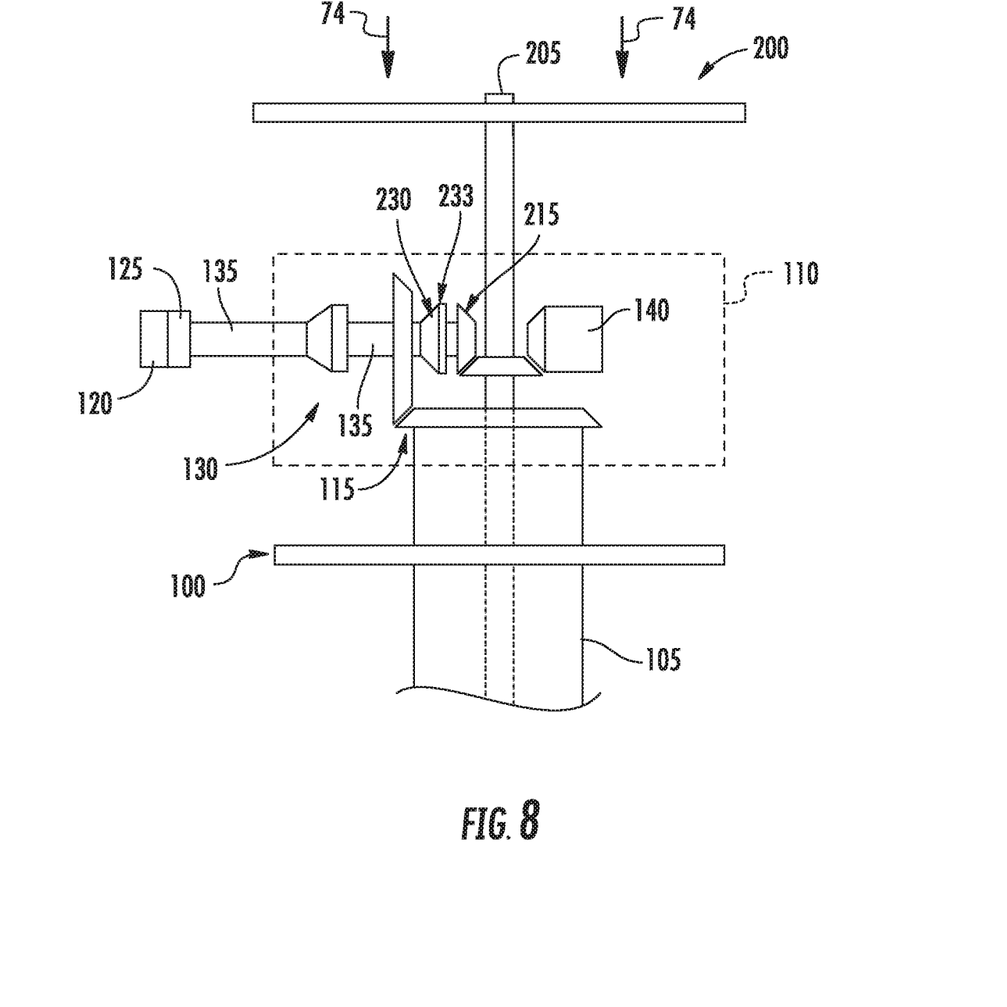

Referring now to FIGS. 7-8, additional exemplary embodiments of the engine 10 including the first clutch assembly 130 are generally provided. The engine 10 generally provided in FIGS. 7-8 may be configured and operated substantially similarly as shown and described in regard to FIGS. 1-6. However, in FIGS. 7-8, the engine 10 further includes an energy source device 140 disposed within the housing 110. The energy source device 140 may define a generator, a motor, a battery, or other energy storage and output device configured to rotate the first rotor assembly 100, the second rotor assembly 200, or both. For example, in one embodiment, the energy source device 140 may include a stator assembly including windings, a rotor assembly configured to rotate generally around the stator assembly, and couplings to extract and transmit energy.

Referring now to FIG. 7, in one embodiment the engine 10 couples the energy source device 140 to the first rotor assembly 100 such as to enable providing motive energy to the first rotor assembly 100 to induce intermittent or continuous rotation of the first rotor assembly 100. For example, the energy source device 140 may be coupled to the first gear assembly 115 such as to transmit energy through the first gear assembly 115 to rotate the first rotor assembly 100.

Referring now to FIG. 8, in another embodiment the engine 10 couples the energy source device 140 to the second rotor assembly 200 such as to enable providing motive energy to the second rotor assembly 200 mechanically coupled to the first rotor assembly 100 such as shown and described previously herein. For example, the energy source device 140 may be coupled to the second gear assembly 215 such as to transmit energy through the second gear assembly 215 to induce rotation of the second rotor assembly 200. As previously described herein, when the second clutch assembly 230 is engaged to the shaft 135, rotation of the second rotor assembly 200 rotates the first rotor assembly 100.

Intermittent rotation may include bursts of energy or rotation such as to dispose a relatively cooler circumferential portion of the first rotor assembly 100 proximate to a relatively warmer circumferential portion of the surrounding engine 10, and a relatively warmer circumferential portion of the rotor assembly 100 proximate to a relatively cooler portion of the surrounding engine 10, such as to reduce a difference in temperature between the relatively warmer and cooler portions of the rotor assembly 100, 200.

Referring back to FIG. 5, in conjunction with FIGS. 7-8, the method 1000 may further include at 1026 rotating the first rotor assembly via the energy source providing energy to the first rotor assembly. In various embodiments, such as described in regard to FIGS. 7-8, the energy source may include the energy source device 140. As previously described, the method 1000 at 1026 may more specifically occur when the first rotor assembly 100 is decoupled from the first accessory assembly 120, such as described in regard to the method 1000 at 1010.

The method 1000 may further include at 1028 rotating the first rotor assembly via the energy source providing energy to the second rotor assembly coupled to the first rotor assembly. As previously described, the method 1000 at 1028 may more specifically occur when the second rotor assembly 200 is coupled to the first rotor assembly 100, such as described in regard to the method 1000 at 1030. Still more specifically, the method 1000 at 1028 may occur when the first rotor assembly 100 is decoupled from the first accessory assembly 120, such as described in regard to the method 1000 at 1010.

Figure 9:
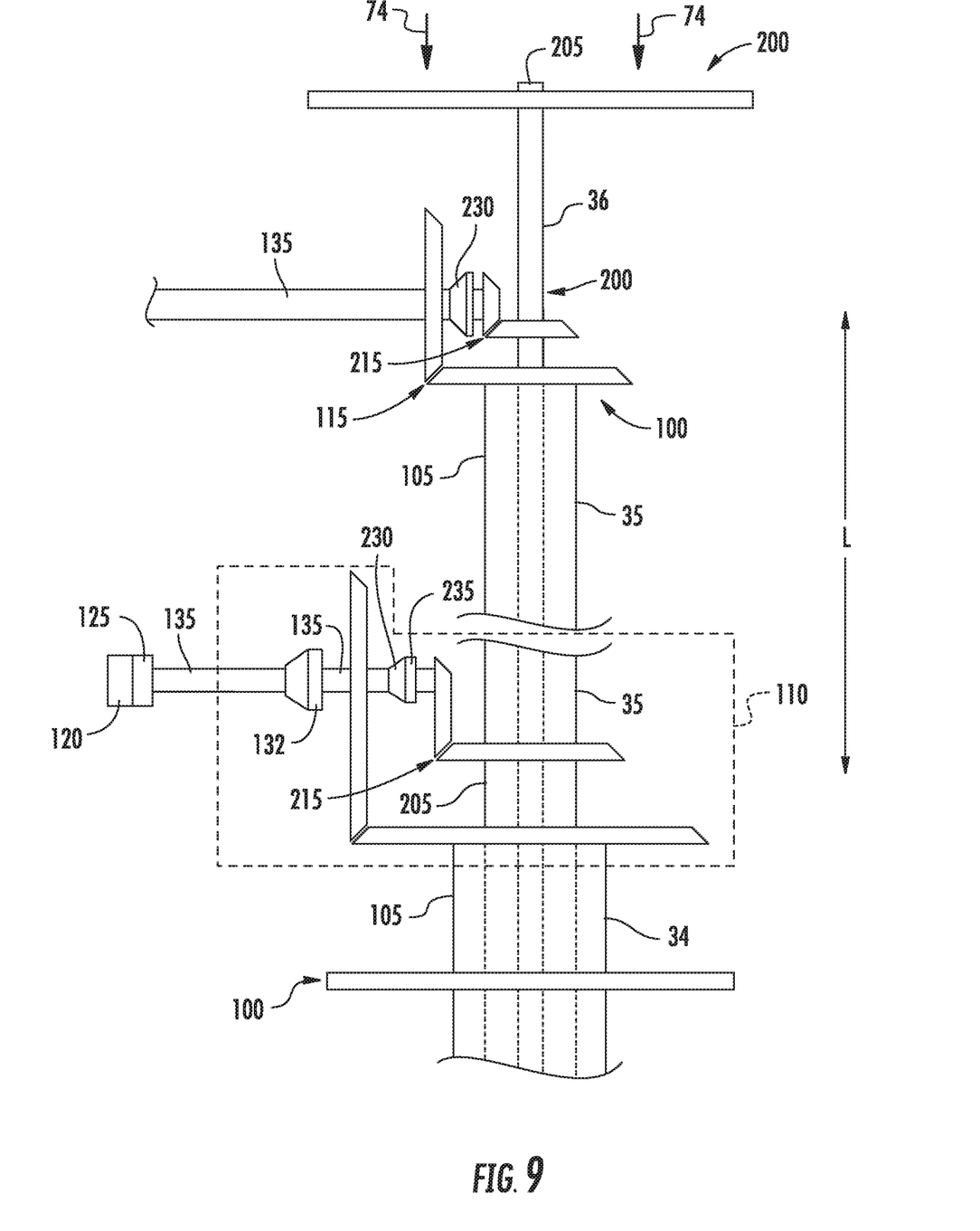

Referring now to FIG. 9, in yet another embodiment of the engine 10, such as a three spool configuration generally provided in FIG. 3, the housing 110 and first clutch assembly 130 may further be disposed at the first rotor assembly 100 and the second rotor assembly 200. For example, a first combination of the housing 110 and first clutch assembly 130 may be disposed at the first rotor assembly 100 defining the HP spool including the HP shaft 34 and the second rotor assembly 200 defining the IP spool including the IP shaft 35. A second combination of the housing 110 and the first clutch assembly 130 may further be disposed at the first rotor assembly 100 defining the IP spool including the IP shaft 35 and the second rotor assembly 200 defining the LP shaft 36. As such, in one embodiment of the engine 10, such as generally provided in FIG. 9, the first clutch assembly 130 may disengage the first rotor assembly 100 defining, at least in part, the HP shaft 34, from the first accessory assembly 120, and the second clutch assembly 230 may engage the second rotor assembly 200 defining, at least in part, the IP shaft 35. Another first clutch assembly 130 may engage another first rotor assembly 100 defining, at least in part, the IP shaft 35, to the second rotor assembly 200 defining, at least in part, the LP shaft 34. The first clutch assembly 130 may further disengage the first rotor assembly 100 from another first accessory assembly 120.

Embodiments of structures and methods generally shown and described in regard to FIGS. 1-9 may mitigate rotor bow in gas turbine engines by overcoming limitations and challenges derived from the first accessory assembly 120. The structures and methods generally shown and described herein enable rotation of the first rotor assembly 100, such as defining the HP spool of the engine 10, following shutdown of the engine 10 such as to reduce a thermal gradient circumferentially and/or axially across the first rotor assembly 100, thereby mitigating thermal bowing. The structures and methods generally provided herein reduce or eliminate inertial forces from the first accessory assembly 120 such as to enable the first rotor assembly 100 to rotate via a flow of air 74, such as natural wind or an external fan assembly. The structures and methods generally provided herein further enable the second rotor assembly 200, such as defining the LP or IP spool, to engage the first rotor assembly 100 and enable rotation of the first rotor assembly 100 via the second rotor assembly 200, such via the fan assembly 14. In combination with reducing or eliminating inertial forces from the first accessory assembly 120, the structures and methods generally provided herein enable windmilling or manual turning of the fan assembly 14, or generally the second rotor assembly 200 defining the LP or IP spool, to further enable rotation of the first rotor assembly 100 defining the HP spool to reduce or eliminate a thermal gradient that may cause thermal bowing.

Reduction or elimination of the thermal gradient across the first rotor assembly 100, the second rotor assembly 200, or both may eliminate thermal bowing, or bowed rotor, or undo the condition in a lessened amount of time over known structures and methods. Reducing or eliminating rotor bow enables engine operators, such as, but not limited to, commercial aircraft, to decrease a turnaround time between engine shutdown and restart. Reduced turnaround time results in additional flights or services, and therefore, additional revenue. Furthermore, the structures and methods generally shown and described herein may satisfy a need in the art due to relatively large turnaround times, or motoring times, of the engine 10 between flights that adversely affect revenue operations of the engine and associated aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of mitigating thermal bowing, the method comprising:
    decoupling a first accessory assembly from a first rotor assembly via a first clutch assembly disposed between the first accessory assembly and the first rotor assembly, wherein decoupling the first accessory assembly and the first rotor assembly occurs below a first speed threshold; and
    flowing a fluid through a gas turbine engine to induce rotation of the first rotor assembly decoupled from the first accessory assembly.

2. The method of claim 1, further comprising:
    coupling the first rotor assembly to a second rotor assembly via a second clutch assembly.

3. The method of claim 1,
    wherein the gas turbine engine comprises a second rotor assembly comprising a second drive shaft extended along a longitudinal direction,
    wherein the first clutch assembly is further disposed between the first accessory assembly, the first rotor assembly, and the second rotor assembly, and
    wherein the gas turbine engine comprises a second clutch assembly coupled to the first clutch assembly and the second rotor assembly,
    the method comprising:
        rotating the second rotor assembly and the first rotor assembly via the flow of fluid through the gas turbine engine.

4. The method of claim 1, wherein the first clutch assembly decouples the first accessory assembly from the first rotor assembly between the first accessory assembly and the first rotor assembly.

5. A method of rotating a first rotor assembly to mitigate thermal bowing, the method comprising:
    decoupling a first accessory assembly from the first rotor assembly via a first clutch assembly disposed between the first accessory assembly and the first rotor assembly, wherein the first clutch assembly decouples the first accessory assembly from the first rotor assembly between the first accessory assembly and the first rotor assembly, wherein decoupling the first accessory assembly and the first rotor assembly occurs below a first speed threshold; and
    rotating the first rotor assembly via a structural energy source providing energy to the first clutch assembly and the first rotor assembly.

6. The method of claim 5, wherein the structural energy source provides intermittent bursts or continuous flows of energy to intermittently or continuously rotate one or more of the first rotor assembly or a second rotor assembly.

7. The method of claim 5, further comprising:
    coupling the first rotor assembly to a second rotor assembly via a second clutch assembly; and
    rotating the second rotor assembly and the first rotor assembly via the energy from the structural energy source.

8. A gas turbine engine configured to:
    mitigate thermal bowing by decoupling a first accessory assembly from a first rotor assembly via a first clutch assembly disposed between the first accessory assembly and the first rotor assembly below a first speed threshold, and flowing a fluid through the gas turbine engine to induce rotation of the first rotor assembly decoupled from the first accessory assembly, the gas turbine engine comprising:
- the first rotor assembly comprising a first drive shaft extended along a longitudinal direction;
- a housing coupled to the first rotor assembly to provide rotation of the first rotor assembly around an axial centerline;
- the first accessory assembly configured to send and/or extract energy to and from the first rotor assembly; and
- the first clutch assembly disposed between the first rotor assembly and the first accessory assembly configured to decouple the first rotor assembly from the first accessory assembly below the first speed threshold of the first rotor assembly.

9. The gas turbine engine of claim 8,
- wherein the first clutch assembly is disposed at a shaft coupled to the first rotor assembly and the first accessory assembly,
- wherein the first clutch assembly decouples at least a portion of the shaft from the first rotor assembly and the first accessory assembly.

10. The gas turbine engine of claim 8,
- wherein the first clutch assembly comprises a first clutch to engage and disengage the first rotor assembly to and from the first accessory assembly, and
- wherein the first clutch is disposed at a shaft coupled to the first rotor assembly and the first accessory assembly.

11. The gas turbine engine of claim 8, wherein the first clutch assembly comprises one or more of a manual clutch, a hydraulic clutch, a pneumatic clutch, a solenoid controlled clutch, a mechanical clutch, an electrical electromagnetic clutch, or an electro-mechanical transmission system, or a centrifugal clutch.

12. The gas turbine engine of claim 8, comprising:
- a mechanical switch coupled to the first clutch assembly,
- wherein switching of the mechanical switch engages and disengages the first clutch assembly to and from the first rotor assembly.

13. The gas turbine engine of claim 8, comprising:
- a second rotor assembly comprising a second drive shaft extended along the longitudinal direction, wherein the first clutch assembly is disposed between the first accessory assembly, the first rotor assembly, and the second rotor assembly;
- a second clutch assembly coupled to the first clutch assembly and the second rotor assembly; and
- a mechanical switch coupled to the first clutch assembly,
- wherein the gas turbine engine is configured to switch the mechanical switch to couple or de-couple the first clutch assembly to and from the first rotor assembly,
- wherein the gas turbine engine is configured to switch the mechanical switch to engage the second clutch assembly to the second rotor assembly when the first clutch assembly is disengaged from the first accessory assembly, and
- wherein the gas turbine engine is configured to switch the mechanical switch to disengage the second clutch assembly from the second rotor assembly when the first clutch assembly is engaged to the first accessory assembly.

14. A gas turbine engine configured to:
rotate a first rotor assembly to mitigate thermal bowing by decoupling a first accessory assembly from the first rotor assembly via a first clutch assembly disposed between the first accessory assembly and the first rotor assembly, wherein the first clutch assembly decouples the first accessory assembly from the first rotor assembly between the first accessory assembly and the first rotor assembly, wherein decoupling the first accessory assembly and the first rotor assembly occurs below a first speed threshold, and rotating the first rotor assembly via a structural energy source providing energy to the first clutch assembly and the first rotor assembly,
the gas turbine engine comprising:
- the first rotor assembly comprising a first drive shaft extended along a longitudinal direction;
- a housing coupled to the first rotor assembly to provide rotation of the first rotor assembly around an axial centerline;
- the first accessory assembly, wherein the first accessory assembly allows energy to and from the first rotor assembly;
- the first clutch assembly disposed between the first rotor assembly and the first accessory assembly, wherein the first clutch assembly decouples the first rotor assembly to and from the first accessory assembly, wherein decoupling the first accessory assembly and the first rotor assembly occurs below the first speed threshold; and
- the structural energy source device disposed within the housing, wherein the structural energy source device rotates the first rotor assembly via the first clutch assembly.

15. The gas turbine engine of claim 14,
- wherein the engine comprises a second rotor assembly comprising a second drive shaft extended along the longitudinal direction,
- wherein the first clutch assembly is further disposed between the first accessory assembly, the first rotor assembly, and the second rotor assembly,
- wherein the gas turbine engine comprises a second clutch assembly coupled to the first clutch assembly and the second rotor assembly, and
- wherein the first clutch assembly is configured to decouple the first accessory assembly from the first rotor assembly between the first accessory assembly and the first rotor assembly.

16. The gas turbine engine of claim 15,
- wherein the second clutch assembly is configured to couple the first rotor assembly to the second rotor assembly; and
- wherein the structural energy source device is configured to rotate the second rotor assembly and the first rotor assembly.

17. The gas turbine engine of claim 14,
- wherein the first clutch assembly is disposed at a shaft coupled to the first rotor assembly and the first accessory assembly,
- wherein the first clutch assembly decouples at least a portion of the shaft from the first rotor assembly and the first accessory assembly.

18. The gas turbine engine of claim 14,
- wherein the first clutch assembly comprises a first clutch to engage and disengage the first rotor assembly to and from the first accessory assembly, and
- wherein the first clutch is disposed at a shaft coupled to the first rotor assembly and the first accessory assembly.

* * * * *